(12) United States Patent
Bustamante et al.

(10) Patent No.: US 10,193,196 B1
(45) Date of Patent: Jan. 29, 2019

(54) INTERNAL BATTERY CELL COOLING WITH HEAT PIPE

(71) Applicants: John G. Bustamante, Orlando, FL (US); Joshua D. Sole, Rockledge, FL (US)

(72) Inventors: John G. Bustamante, Orlando, FL (US); Joshua D. Sole, Rockledge, FL (US)

(73) Assignee: MAINSTREAM ENGINEERDING CORPORATION, Rockledge, FL (US)

( * ) Notice: Subject to any disclaimer, the term of this patent is extended or adjusted under 35 U.S.C. 154(b) by 345 days.

(21) Appl. No.: 15/132,668

(22) Filed: Apr. 19, 2016

(51) Int. Cl.
  *H01M 10/613* (2014.01)
  *H01M 10/6569* (2014.01)
  *H01M 10/04* (2006.01)

(52) U.S. Cl.
  CPC ..... *H01M 10/613* (2015.04); *H01M 10/0422* (2013.01); *H01M 10/6569* (2015.04)

(58) Field of Classification Search
  CPC .......... H01M 10/613; H01M 10/6569; H01M 10/0422
  See application file for complete search history.

(56) References Cited

U.S. PATENT DOCUMENTS

| 3,865,630 | A | 2/1975 | Reimers |
| 4,324,845 | A | 4/1982 | Stockel |
| 6,010,800 | A * | 1/2000 | Stadnick ........... H01M 10/6553 429/120 |
| 6,146,786 | A | 11/2000 | Stadnick et al. |
| 6,653,002 | B1 | 11/2003 | Parise |
| 6,933,076 | B2 | 8/2005 | Ura et al. |
| 8,785,124 | B2 | 7/2014 | Han et al. |
| 9,113,577 | B2 | 8/2015 | Quisenberry |
| 2011/0059346 | A1 | 3/2011 | Jeong et al. |
| 2011/0129706 | A1 | 6/2011 | Takahashi et al. |
| 2012/0148881 | A1 | 6/2012 | Quisenberry |
| 2013/0130074 | A1 | 5/2013 | Timmons et al. |

OTHER PUBLICATIONS

Bandhauer, T. M., S. Garimella, and T. Fuller, (2011). "A Critical Review of Thermal Issues in Lithium-Ion Batteries." Journal of the Electrochemical Society 158(3): R1-R25.
Bandhauer, T. M. and S. Garimella (2013). "Passive, internal thermal management system for batteries using microscale liquid-vapor phase change." Applied Thermal Engineering 61(2): 756-769.
Mohammadian, S. K, Y.-L. He, et al. (2015). "Internal cooling of a lithium-ion battery using electrolyte as coolant through microchannels embedded inside the electrodes." Journal of Power Sources 293: 458-466.
Shah, K., C. McKee, D. Chalise, A. Jain (2016). Experimental and Numerical Investigation of Heat Pipe Based Cooling of Lithium-Ion Cells. First Pacific Rim Thermal Engineering Conference (PRTEC), Big Island. Hawaii. Mar. 13-17.

* cited by examiner

*Primary Examiner* — Jane J Rhee

(57) ABSTRACT

A passive battery cooling system for removing heat generated during battery charging and discharging and a method for production of such a system are disclosed. The passive system transfers heat from the internal heat-generating portions of the battery cell using a heat pipe which is incorporated inside a cylindrical or flat battery cell to reduce peak cell temperatures and improve temperature uniformity within the cell.

19 Claims, 4 Drawing Sheets

INTERNAL BATTERY CELL COOLING WITH HEAT PIPE

BACKGROUND AND SUMMARY OF THE INVENTION

The present invention relates to a battery cooling system and a method of making such a system, and more specifically, to a battery cooling system that uses a heat pipe to remove heat from a central location of a battery cell.

Effective thermal management is critical to maintaining the safety, performance, and operating life of batteries. In lithium-ion batteries, for example, poor temperature control can lead to, among other issues, capacity fade, self-discharge, and thermal runaway. Typically, this thermal management focuses on removing heat that is generated throughout the battery during charging and discharging.

Currently, heat is removed from lithium-ion batteries from the outside of the battery cells. Heat is transferred by conduction to the edge of the cells, and then removed by air cooling, liquid cooling, fins, phase change material, or other methods. The low thermal conductivity inside the battery cell leads, however, to high peak internal temperatures and temperature non-uniformity within the battery cell.

The recognized optimal method for removing heat with minimal thermal resistance is to transfer heat from the location of the heat generation, which, in the case of a battery cell, is throughout the layers of the battery wrap. This has been recognized by studies published in the literature. Modern lithium-ion batteries are fabricated of a number of thin layers, consisting of positive and negative electrodes, positive and negative current collectors, and separator layers. These layers are then wrapped or stacked into either a cylindrical or flat, also known as prismatic, shape. Up until now, integrating a heat removal mechanism into the interior to this cell has been a challenge due to the complex geometry and the coupled electrochemical-thermal physics of these batteries.

One method of removing heat from inside the battery, as opposed to current external cooling methods, is to integrate microchannels into the battery layers. In one proposed design, microchannels would be integrated into the current collector layer or be placed in a separate sheet between a split current collector layer. Passive, two-phase liquid vapor flow through these channels would then cool the battery. Alternatively, it has been proposed to incorporate channels in the positive and negative electrode layers, using water or electrolyte as the working fluids. Studies of both methods have suggested that internal cooling methods can significantly improve battery thermal performance, but incorporating microchannels into either location is a substantial manufacturing challenge.

In addition to the heat removal methods described above, heat pipes have been recognized as a potential method of removing heat from batteries. Heat pipes use passive liquid-vapor phase change to provide very high effective thermal conductivities and transfer heat at a uniform temperature, making them well suited for battery thermal management systems. These approaches, however, typically remove heat from the external surface of the battery cells. That is, the heat pipes are placed between the battery cells and thus the batteries can still suffer from high internal peak temperatures and temperature non-uniformity due to the low thermal conductivity of the battery cells.

An abstract (Shah, K., C. McKee, D. Chalise, A. Jain (2016). *Experimental and Numerical Investigation of Heat Pine Based Cooling of Lithium-Ion Cells*) was distributed among attendees at the First Pacific Rim Thermal Engineering Conference held between Mar. 13-17, 2016. The abstract authors proposed embedding an open pipe inside a battery cell, and placing a heat pipe inside the open pipe. Reference is made to a test cell, not a battery cell, with an electric heater surrounded by poly-dimethylsiloxane (PDMS), with a pipe in the center of the container. They concluded, however, that incorporating a heat pipe in an actual battery cell would require changes in the manufacturing of the Li-ion cell which may lead to reliability issues that would have to be carefully studied.

The present invention's approach has several differences from that broadly outlined in the above-mentioned abstract that make manufacture in modern battery cell designs practical, including (a) not needing the heat pipe to be placed in a separate hollow tube, (b) not requiring extension through both ends of the cell so as to minimize space and sealing requirements, (c) using a thin electrically-isolating layer, (d) identifying methods of sealing the heat pipe in the battery case, (e) being able to employ multiple battery cell geometries and (f) being capable of simultaneously using internal and external cooling to improve cell thermal performance.

The present invention thus provides a new, improved and practical method of removing heat from individual battery cells using heat pipes. In the present invention, the heat pipe is located centrally in the battery cell without the need for a separate pipe to transfer heat from the internal components to the condenser of the heat pipe located outside of the battery cell. The heat pipe is electrically isolated from the internal battery materials with a thin layer and does not require the heat pipe to have material compatibility with the electrolyte or other battery materials. Another advantage of this technology is that it can be applied to cylindrical or flat cells and be used to remove all of the generated heat or be combined with known simultaneous external cooling methods.

In the present invention, the heat pipe is located in the center of an individual battery cell. The heat pipe can be cylindrical or have a flat profile. A cylindrical heat pipe diameter can range, for example, from 0.1 mm to 150 mm, and a flat heat pipe can, for example, have a thickness of 0.1 mm to 150 mm and width of 0.1 mm to 1000 mm. With either type of heat pipe, the heat pipe evaporator is located centrally of the cell and the condenser is located outside the cell. The condenser can be cooled using an external cooling source such as air cooling, liquid cooling, two-phase cooling, thermal energy storage, or conduction into a cold plate. The surface of the condenser can be enhanced by fins or other structures, and the heat pipe portion outside the battery cell can be straight or curved. The heat pipe of the present invention could also be replaced with similar passive, two-phase flow devices such as thermosiphons or loop heat pipes.

The present invention can be fabricated by directly wrapping the battery layers around the heat pipe, or placing the heat pipe inside a stabilization device such as a pipe or half-pipe to provide structural rigidity. This stabilization device is advantageous because heat pipes are hollow with thin walls, which may not be sufficient to withstand the forces applied during battery fabrication. The stabilization device could be removed after the winding has begun or after fabrication. With prismatic or flat battery geometries, the battery materials can still be wrapped around a flat heat pipe, or alternatively be stacked on each side of a flat heat pipe.

The heat pipe is electrically isolated from the internal battery materials with a thin layer of material, such as epoxy, that has an appropriate low electrical conductivity and good material compatibility with the battery and heat pipe materials. This material can be directly deposited on the surface of the heat pipe or the heat pipe can be placed in a mold which is filled with the material. The material can be applied to the entire heat pipe or just to the portion of the heat pipe located inside the battery cell. This electrical isolation allows the heat pipe to be fabricated from materials that are not chemically compatible with the electrolyte or other battery materials. In addition, the approach of the present invention allows the heat pipe to be electrically isolated from the positive and negative terminals if desired. This provides flexibility in the design of the module and pack-level cooling strategy.

The evaporator portion of the heat pipe is sealed inside the battery cell, and the remainder of the heat pipe can extend out one or both sides of the battery cell. An O-ring, compression fitting, or weld can be employed where the heat pipe passes through the cell case to seal the case. This sealing can be used with either cylindrical or flat cells, and the cells can have either hard cases or be placed in pouches.

The cooling approach of the present invention can be used as the sole source of heat removal from the battery or simultaneously with external cooling approaches. If used alone, the area surrounding the battery cells can be used to thermally isolate the surrounding cells from each other, thereby improving battery safety in the event of an individual battery cell failure. In many external cooling methods, battery cell failure can propagate to neighboring cells and further damage the battery pack. Alternatively, the simultaneous use of the present invention with an external cooling method can remove larger amounts of heat from the battery cell and improve battery thermal management. The simultaneous external cooling method could, for example, cool the sides of the cell, cool the ends of the cell, or cool the cell via battery bus bars. The external cooling method could also cool the condenser portion of the heat pipe.

BRIEF DESCRIPTION OF THE DRAWINGS

These and other features, objects and advantages of the present invention will become more readily apparent from the following more detailed description when taken in conjunction with the accompanying drawings wherein.

DETAILED DESCRIPTION OF THE DRAWINGS

Figure 1A:
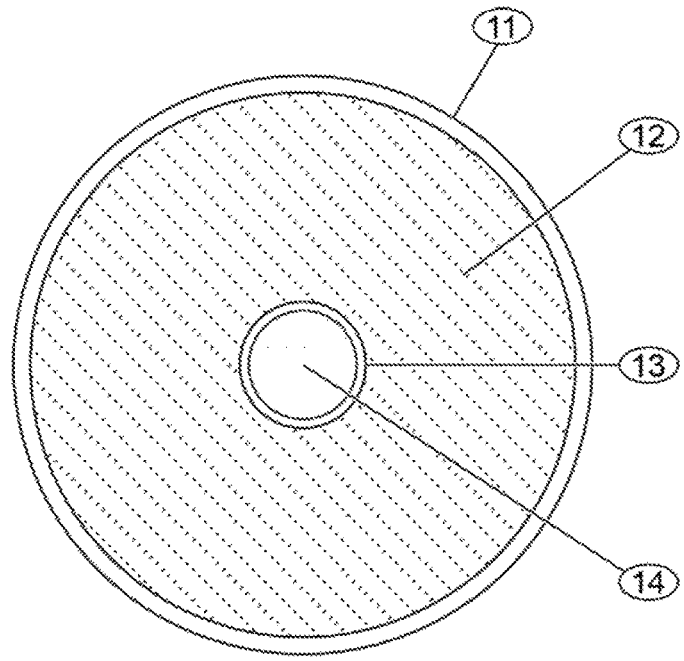
FIGS. 1A and 1B are, respectively, a cross-sectional top view of a cylindrical battery cell with an internal heat pipe and (b) an isometric view that cylindrical cell in accordance with the present invention.
Figure 1B:
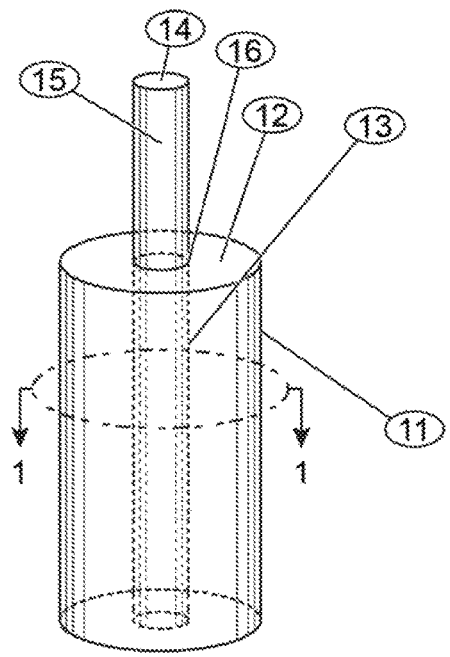

Referring first to FIGS. 1A and 1B (the former being a cross-sectional view taken along plane 1-1 of the latter), a battery cell is enclosed by a cylindrical case 11 and contains an internal battery winding 12 having a number of wound thin layers, including positive and negative electrodes, positive and negative current collectors, and separator as is generally known to those skilled in the art. A heat pipe 14 of conventional construction is, however, now placed in the center of the battery winding 12 and is enclosed by a thin electrically-isolating layer 13. FIG. 1B shows that the evaporator of the heat pipe 14 is located inside the battery case 11, but the heat pipe extends through the battery case 11 with the heat pipe condenser 15 located outside the battery cell. There is a seal 16 between the heat pipe 14 and the battery case 11 where the two intersect, sealing the heat pipe evaporator 14 inside the battery cell. The electrically-isolating layer 13 can either enclose only the portion of the heat pipe 14 inside the battery cell or, alternatively, be applied to the entire heat pipe.

Figure 2A:
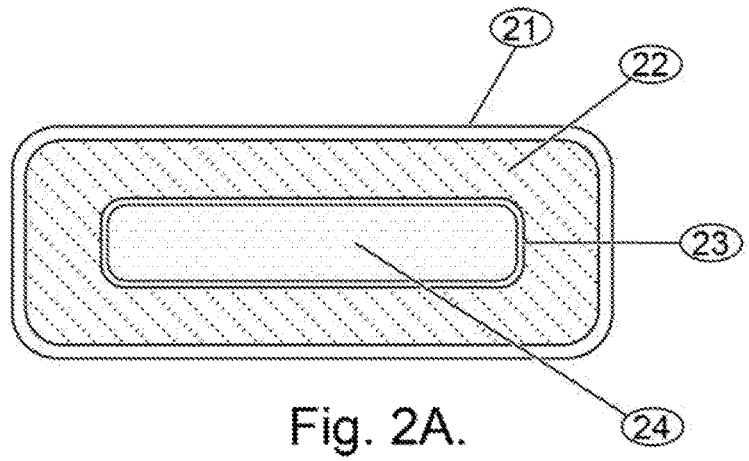
FIGS. 2A and 2B are, respectively, a cross-sectional top view of one embodiment of a flat battery cell with the battery layers wrapped around an internal heat pipe and an isometric view of that flat battery cell in accordance with the present invention.
Figure 2B:
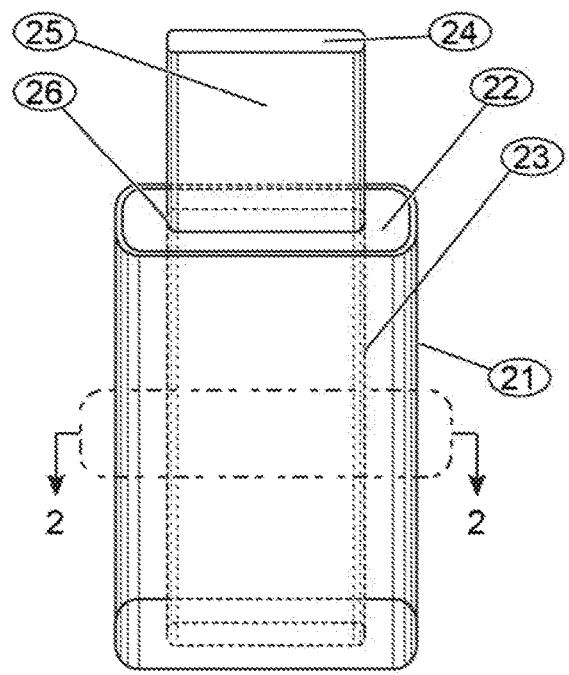

Referring to FIGS. 2A and 2B (the former being a cross-sectional view taken along plane 2-2 of the latter), a flat battery cell is enclosed by a rectangular case 21 and contains an internal battery winding 22 wrapped around a flat heat pipe 24 enclosed by an electrically-isolating layer 23. As in the above-described cylindrical battery embodiment, the battery winding 22 consists of a number of stacked thin layers, including positive and negative electrodes, positive and negative current collectors, and separator as is generally known. This embodiment shares the same features as the cylindrical heat pipe and battery shown in FIGS. 1A and 1B, including the inclusion of an electrically isolating layer 23, the location of the heat pipe 24 evaporator inside the battery case 21, the seal 26 between the heat pipe 24 and battery case 21, and the heat pipe condenser 25 located outside of the rectangular battery case 21 which can be formed as a hard shell case or a soft pouch.

Figure 3A:
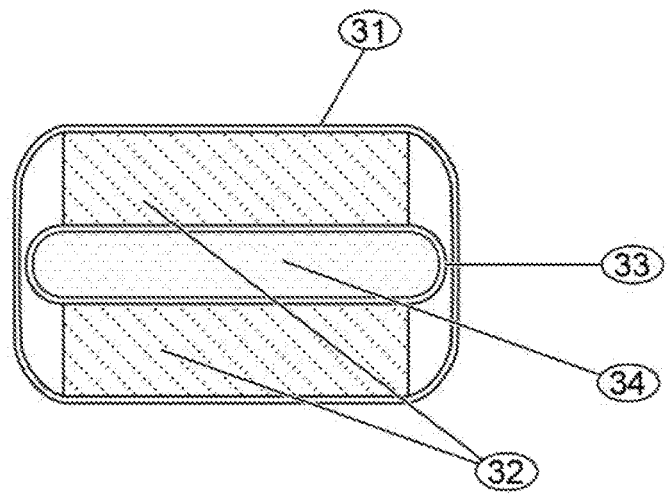
FIGS. 3A and 3B are, respectively, a cross-sectional top view of another embodiment of a flat battery cell but with the battery layers stacked on either side of an internal heat pipe and an isometric view of the second flat battery embodiment in accordance with the present invention.
Figure 3B:
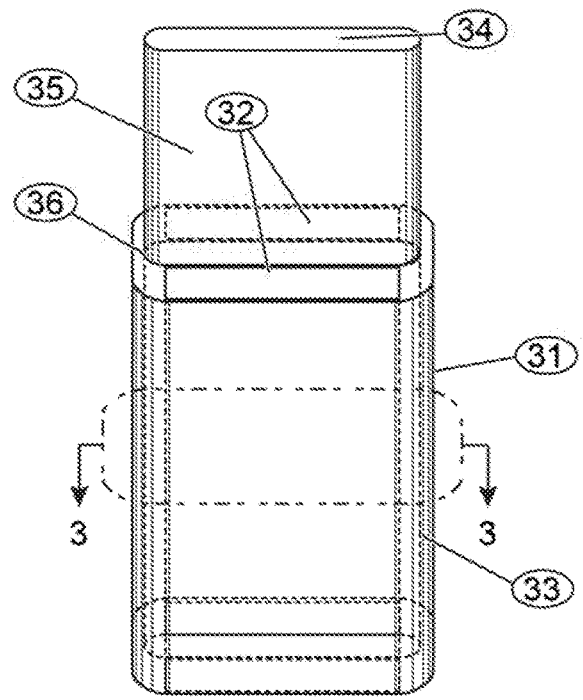

In the embodiment shown in FIGS. 3A and 3B (the former being a cross-sectional view taken along plane 3-3 of the latter), the present invention is configured as a flat heat pipe 34 where the battery layers 32 are stacked on either size of the flat heat pipe. In this embodiment, however, rather than winding the battery layers around the heat pipe as in the above-described embodiments, the battery layers 32 are stacked as flat sheets on both sides of the heat pipe 34. The heat pipe 34 is surrounded by an electrically-isolating layer 33, and the heat pipe and battery layers are enclosed in the battery case 31. This embodiment also features the heat pipe 34 evaporator inside the battery case 31, while heat pipe condenser 35 is located outside of the battery case and there is a seal 36 where the heat pipe 34 and battery case 31 intersect.

Figure 4A:
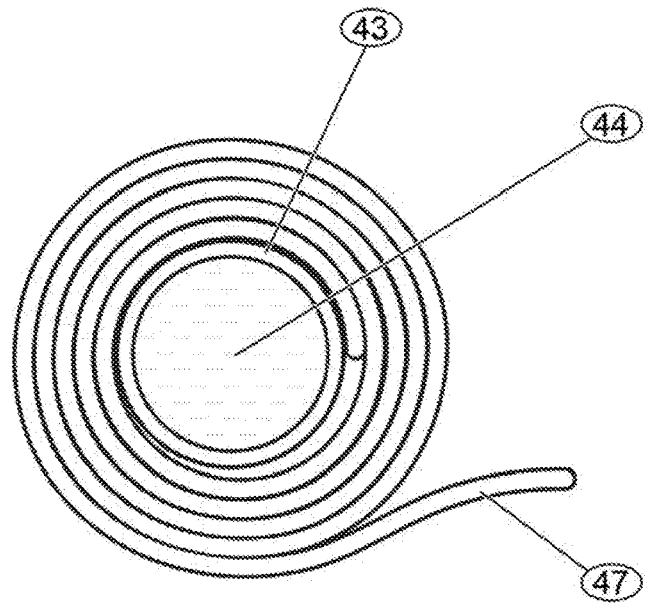
FIGS. 4A and 4B are, respectively, a cross-sectional view of battery layers being wrapped directly around a heat pipe and battery layers being wrapped around a heat pipe with the aid of a removable stabilization device.
Figure 4B:
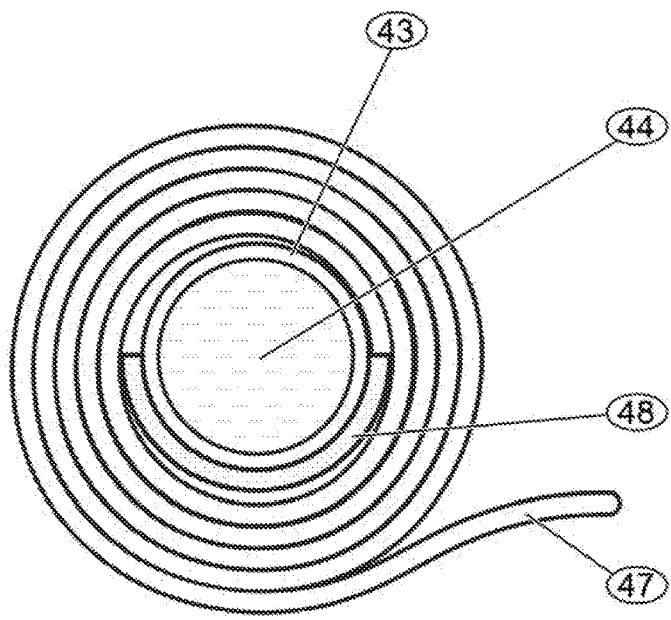

FIGS. 4A and 4B show two methods of producing the battery cell with the centrally-located heat pipe. In FIG. 4A, the battery layers 47 are directly wrapped around the heat pipe 44 that is enclosed in an electrically-isolating layer 43. In FIG. 4B, the heat pipe 44 is first placed inside a stabilization device 48. The battery layers 47 are wrapped around the heat pipe 44 and stabilization device 48, and the additional device is removed after one or more battery layers are applied. In this embodiment, the stabilization device 48 is shown as a half-pipe providing structural support to the heat pipe 44.

The foregoing disclosure has been set forth merely to illustrate the invention and is not intended to be limiting. Since modifications of the disclosed embodiments incorporating the spirit and substance of the invention may now occur to persons skilled in the art with the benefit of this disclosure, the invention should be construed to include everything within the scope of the appended claims and equivalents thereof.

We claim:

1. A battery cooling system, comprising at least one battery cell within a case, and a two-phase flow device having evaporator portion located centrally within and electrically isolated from the at least one battery cell, wherein the at least one battery cell wraps completely around an entire perimeter of the evaporator portion.

2. The system of claim 1, wherein a thin layer of material is provided between components of the battery cell and the flow device for electrically isolating the flow device from the battery cell.

3. The system of claim 2, wherein the material is epoxy.

4. The system of claim 1, wherein the battery cell case is configured as one of cylindrically-shaped and flat-shaped.

5. The system of claim 1, wherein the flow device is configured as one of a cylindrically-shaped flow device and a flat-shaped flow device.

6. The system of claim 5, wherein the battery cell case is configured as one of cylindrically-shaped and flat-shaped.

7. The system of claim 1, wherein a cooling system is associated with the condenser portion.

8. The system of claim 7, wherein the cooling system comprises at least one of air cooling, liquid cooling, two-phase cooling, thermal energy storage cooling, and cold plate conduction.

9. The system of claim 1, wherein the flow device is one of a heat pipe, a thermosiphon, and a vapor chamber.

10. The system of claim 9, wherein the heat pipe is a loop heat pipe.

11. The system of claim 1, wherein the at least one battery cell comprises a plurality of battery cells thermally isolated from each other.

12. The system of claim 1, wherein the at least one battery cell is comprised of a plurality of thin layers, positive and negative current collectors and a separator.

13. A method of producing a battery cooling system having at least one battery cell in a case and a two-phase flow device with evaporator and condenser portions, comprising: one of (a) wrapping layers of the at least one battery cell directly completely around an entire perimeter of the evaporator or completely around a removable stabilization device containing the evaporator and (b), applying a thin layer of insulating material between the at least one battery cell and the evaporator by one of (i) depositing the insulating material directly on the two-phase flow device and (ii) placing the two-phase flow device in a mold containing the insulating material.

14. The method of claim 13, wherein only the evaporator portion is sealed within the at least one battery cell.

15. The method of claim 13, wherein the insulating material is applied to only the evaporator portion.

16. The method of claim 13, wherein the flow device is configured as a heat pipe.

17. The method of claim 13, further comprising placing the condenser portion outside the at least one battery cell.

18. The method of claim 17, further comprising adding a cooling mechanism at the condenser portion.

19. The method of claim 13, further comprising configuring the at least one battery cell case with one of a cylindrical shape and a flat shape.

* * * * *